United States Patent [19]

Scholz et al.

[11] Patent Number: 6,094,635
[45] Date of Patent: *Jul. 25, 2000

[54] SYSTEM AND METHOD FOR SPEECH ENABLED APPLICATION

[75] Inventors: Karl Wilmer Scholz, Strafford; Reginald Victor Blue, Exton; Raymond Alan Diedrichs, Chalfont; Joseph Patrick Walsh, Spring City, all of Pa.

[73] Assignee: Unisys Corporation, Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,938

[22] Filed: Sep. 17, 1997

[51] Int. Cl.⁷ .................................................. G10L 15/22
[52] U.S. Cl. ........................................... 704/270; 704/275
[58] Field of Search ............................. 704/8, 9, 10, 231, 704/243, 251, 257, 270, 275

[56] References Cited

U.S. PATENT DOCUMENTS 5,390,279  2/1995  Strong ....................................... 704/200
5,642,519  6/1997  Martin ....................................... 704/255
5,748,974  5/1998  Johnson ........................................ 704/9
5,924,070  7/1999  Ittycheriah et al. ..................... 704/275
5,995,918  11/1999  Kendall et al. ........................... 704/257

FOREIGN PATENT DOCUMENTS

07004864    1/1995   Japan .
WO 97/10589 9/1996   WIPO .

*Primary Examiner*—David R. Hudspeth
*Assistant Examiner*—Martin Lerner
*Attorney, Agent, or Firm*—John B. Sowell; Mark T. Starr; Steven B. Samuels

[57] ABSTRACT

The present invention is a computer apparatus and method for adding speech interpreting capabilities to an interactive voice response system. An annotated corpus is used to list valid utterances within a grammar along with token data for each valid utterance representing the meaning implied behind the valid utterance. When valid utterances are detected, the interactive voice response system requests that a search is made through the annotated corpus to find the token identified with the valid utterance. This token is returned to the interactive voice response system. If the valid utterance included a variable, additional processing is performed to interpret the variable and return additional data representing the variable.

19 Claims, 5 Drawing Sheets

Figure 1

| Name | Accepts | Returns |
|---|---|---|
| TIME1 | one o'clock p.m.; thirteen hundred hours | 1:00 PM (normal format) |
| TIME2 | one o'clock p.m.; thirteen hundred hours | 13:00 (European/military format) |
| INTEGER1 | one hundred twenty three | digits |
| INTEGER2 | one two three . . . (ten digits) | digits |
| CURRENCY1 | twenty three dollars and fifteen cents | 23.15 |
| CURRENCY2 | two three dollars and fifteen cents | 23.15 |
| DATE1 | march first nineteen ninety seven; the first of march | 03/01/1997 (American format) |
| DATE2 | march first nineteen ninety seven; the first of march | 01/03/1997 (European format) |

SYSTEM AND METHOD FOR SPEECH ENABLED APPLICATION

CROSS-REFERENCE TO RELATED APPLICATION

This application is related to copending U.S. application Ser. No. 08/932,937, filed on Sep. 17, 1997 entitled SYSTEM AND METHOD FOR CREATING A LANGUAGE GRAMMAR, and commonly assigned with the present invention.

FIELD OF THE INVENTION

This invention relates generally to computerized natural language systems. More particularly, it relates to a computer system and method for providing speech understanding capabilities to an interactive voice response system. It further relates to a computer system and method for interpreting spoken utterances in a constrained speech recognition application.

DESCRIPTION OF THE RELATED ART

Computers have become a mainstay in our everyday lives. Many of us spend hours a day using the machines at work, home and even while shopping. Using a computer, however, has always been on the machine's terms. A mouse, pushbuttons and keyboards have always been somewhat of an unnatural way to tell the computers what we want. However, as computer technology continues to advance, the computer is edging towards communicating with humans on our terms: the spoken word.

There are essentially two steps in creating a computer that can speak with humans. First, the computer needs an automatic speech recognition to detect the spoken words and convert them into some form of computer-readable data, such as simple text. Second, the computer needs some way to analyze the computer-readable data and determine what those words, as they were used, meant. This second step typically employs some form of artificial intelligence, and there are several basic approaches researchers have taken to develop a system that can extract meaning from words.

One such approach involves statistical computational linguistics. This approach relies on the relatively predictable nature of human speech. Statistical computational linguistics begins with a corpus, which is a list of sample utterances contained in the grammar. This corpus is analyzed and statistical properties of the grammar are extracted. These statistical properties are implemented in rules, which are then applied to new, spoken utterances in an attempt to statistically "guess" the meaning of what was said.

Because of the large number of possible utterances in any language (English, Chinese, German, etc.), no corpus-based language system attempts to list the full set of valid utterances in that language. Some systems, however, have attempted to reduce the number of possible utterances by constraining, or restricting, the valid ones to those in a predefined grammar. For example, U.S. Pat. No. 5,652,897 issued Aug. 29, 1997 to Linebarger, et al, assigned to Unisys Corporation, Blue Bell, Pa. and incorporated herein by reference, teaches a language processor that only understands air traffic control instructions. There, the air traffic controller's sentence was segmented into individual instructions, which were then individually processed to determine their meaning. Unfortunately, this type of processing can quickly consume much computing power when the valid grammar is increased from the relatively limited vocabulary of air traffic controls to, for example, a bank automated teller machine that can handle all sorts of transactions.

Other natural language systems may allow for a full range of utterances, but this high degree of generality also requires much computing power. What is needed is a language understanding system that can interpret speech in a constrained grammar that does not require the full generality of a natural language system.

SUMMARY OF THE INVENTION

A general purpose of the present invention is to provide system and method for providing constrained speech understanding capabilities to an interactive voice recognition system.

Another object of the present invention is to provide system and method for simplifying the task of interpreting the meaning behind a spoken utterance.

A further object of the present invention is to provide system and method for creating a corpus-based speech recognition system that is highly accurate in its interpretation of the meaning behind a spoken utterance.

A still further object of the present invention is to provide a system and method for employing a plurality of runtime interpreters that are connected to the interactive voice response system by a computer network.

These and other objects are accomplished by the present invention which provides a runtime interpreter for determining the meaning behind a spoken utterance with a simple search of a list. The runtime interpreter receives, as input, an annotated corpus which is a list of valid utterances, context identifiers for each valid utterance, and token data for each valid utterance representing the implied meaning behind the utterance. The runtime interpreter also receives, as input, an utterance in text form which is to be found in the corpus.

When the runtime interpreter is given an utterance to interpret, the runtime interpreter searches through the corpus, locates the valid utterance being searched for, and returns the token which represents the meaning of the valid utterance.

The runtime interpreter also supports the desired use of variables to reduce the size of the corpus. Some utterances may include numbers, dates, times or other elements that have too many combinations to enumerate in the corpus. For example, the utterance "My birthday is xxx", where 'xxx' is the day of the year, could result in 366 corpus entries, one for each possible day of the year (including leap day). In the present invention, however, a variable would be used to represent the date. Thus, a reduced corpus would include just one entry for this utterance: "My birthday is [DATE]". The runtime interpreter is able to identify these variables in the corpus, and performs additional processing during runtime to interpret the variables. The variable values, once interpreted, are then stored in a predefined data structure associated with the token whose utterance included the variable. This variable value can then be retrieved by the interactive voice response system.

The present invention also provides a custom processor interface which allows the developer of the interactive voice response system the ability to customize the operation of the runtime interpreter without actually modifying the interpreter itself.

Furthermore, the present invention provides for a system and method for using a plurality of interpreters that are connected to a computer network. Distributed interpreters are provided which include the same custom processor interface and runtime interpreter mentioned above. The distributed interpreters, however, include an additional manager for controlling messaging between the distributed interpreter and the computer network. A resource manager is also provided, which keeps track of the distributed interpreters that are connected to the network and manages their use by an interactive voice response system.

BRIEF DESCRIPTION OF THE DRAWINGS

FIG. 3 depicts sample formats for the annotated ASR corpus files and vendor-specific ASR grammar file.

DESCRIPTION OF THE PREFERRED EMBODIMENT

Before describing the present invention, several terms need to be defined. These terms, and their definitions, include:

annotated ASR corpus file—data file containing a listing of valid utterances in a grammar, as well as token data for each valid utterance which represents the meaning of the valid utterance to the interactive voice recognition system (IVR 130).

automatic speech recognition (ASR)—generic term for computer hardware and software that are capable of identifying spoken words and reporting them in a computer-readable format, such as text (characters).

cells—discrete elements within the table (the table is made up of rows and columns of cells). In the example rule given with the definition of 'rules' below, each of "I want", "I need" and "food" would be placed in a cell. Furthermore, in the preferred embodiment, the cells containing "I want" and "I need" are vertically adjacent to one another (same column). Vertically adjacent cells are generally OR'd together. The cell containing "food", however, would occur in the column to the right of the "I want" and "I need" column, indicating the fact that "food" must follow either "I want" or "I need" and as such, the cell containing "food" will be AND'd to follow the cells containing "I want" and "I need".

constrained grammar—a grammar that does not include each and every possible statement in the speaker's language; limits the range of acceptable statements.

corpus—a large list.

grammar—the entire language that is to be understood. Grammars can be expressed using a set of rules, or by listing each and every statement that is allowed within the grammar.

grammar development toolkit (104)—software used to create a grammar and the set of rules representing the grammar.

natural language understanding—identifying the meaning behind spoken statements that are spoken in a normal manner.

phrase—the "building blocks" of the grammar, a phrase is a word, group of words, or variable that occupies an entire cell within the table.

rules—these define the logic of the grammar. An example rule is: ("I want"|"I need")("food"), which defines a grammar that consists solely of statements that begin with "I want" OR "I need", AND are immediately followed with "food".

runtime interpreter (124)—software that searches through the annotated corpus (122) whenever a valid utterance is heard, and returns a token representing the meaning of implied in the valid utterance.

runtime interpreter application program interface (RIAPI)—set of software functions that serve as the interface through which the interactive voice response system (130) uses the runtime interpreter.

speech recognizer (116)—combination of hardware and software that is capable of detecting and identifying spoken words.

speech recognizer compiler (114)—software included with a speech recognizer (116) that accepts, as input, a vendor-specific ASR grammar file (112) and processes the file (112) for use in a speech recognizer (116) during runtime.

table—two dimensional grid used to represent a grammar. Contents of a table are read, in the preferred embodiment, from left to right.

token—each valid utterance in the table is followed by a cell that contains a token, where the token is a unique data value (created by the developer when s/he develops the grammar) that will represent the meaning of implied in that valid utterance to the interactive voice response system (130).

utterance—a statement.

utterance, spoken—an utterance that was said aloud. The spoken utterance might also be a valid utterance, if the spoken utterance follows the rules of the grammar.

utterance, valid—an utterance that is found within the grammar. A valid utterance follows the rules which define the grammar.

variable—"place holder" used in the corpus (122) to represent a phrase which has too many possibilities to fully enumerate. For example, the utterance "My favorite number between one and a million is xxx" could result in 999,998 corpus entries, one for each possible number. In the present invention, however, a variable would be used to represent the number in the corpus (122). Thus, a reduced corpus (122) would include just one entry for this utterance: "My favorite number between one and a million is [INTEGER]". The runtime interpreter (124) is able to identify this variable in the corpus, and performs additional processing during runtime to interpret the number.

vendor-specific ASR grammar file (112)—a data file that contains the set of rules representing a grammar, and is written in a format that will be recognized by the speech recognizer compiler (114).

Figure 1:
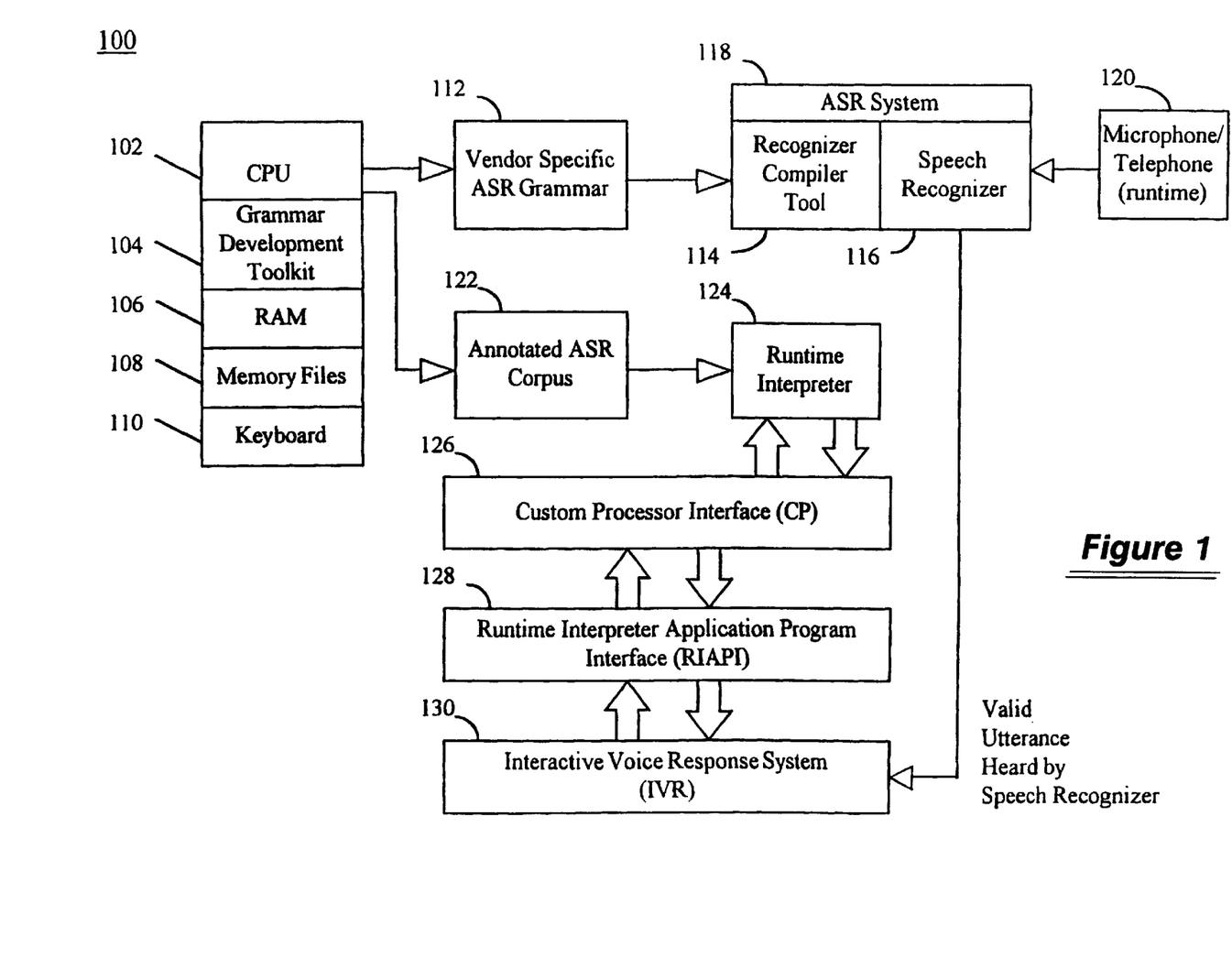
FIG. 1 depicts an overview of an embedded natural language understanding system.

Referring now to the drawings, where elements that appear in several drawings are given the same element number throughout the drawings, the structures necessary to implement a preferred embodiment of an embedded natural language understanding system (100) are shown in FIG. 1. The basic elements comprising:

an interactive voice response system (130), or IVR;

the grammar development toolkit (104);

a compiler (114) and speech recognizer (116) that are part of an automatic speech recognition (ASR) system (118);

an annotated automatic speech recognition (ASR) corpus file (122);

a vendor-specific ASR grammar file (112);

the runtime interpreter (124); and the custom processor interface (126), or CP; and the runtime interpreter application program interface (128), or RIAPI. These elements will be discussed in detail further below, but an initial overview of the embedded architecture will be helpful to a full understanding of the elements and their roles.

1. Overview of Embedded Architecture

The following overview discusses the embedded architecture, which employs a single runtime interpreter (124). There is a second, distributed, architecture which employs a plurality of runtime interpreters. The distributed architecture will be discussed further below.

The first step in implementing a natural language system is creating the set of rules that govern the valid utterances in the grammar. As an example, a grammar for the reply to the question: "what do you want for lunch?" might be represented as:

<reply>: (("I want"|"I'd like") ("hotdogs"|"hamburgers")); Under this set of rules, all valid replies consists of two parts: 1) either "I want" or "I'd like", followed by 2) either "hot dogs" or "hamburgers". This notation is referred to as Backus-Naur-Form (BNF), a form of grammar that uses logical ANDS and ORs. The preferred embodiment of the present invention generates this type of grammar.

Referring to FIG. 1, the grammar is generated by a developer using the grammar development toolkit (104). In the preferred embodiment, the toolkit (104) is developed using a computer that has an Intel-based central processing unit (CPU 102) (such as the Intel PentiumR) with Microsoft Visual BasicR as the software development program. The computer also contains random access memory (RAM 106), memory files (108) stored in system memory, and keyboard (110).

The toolkit (104) is a novel spreadsheet-oriented software package that provides the developer of a natural language application with a simplified way of generating a grammar.

When the developer has completed the grammar using the toolkit (104), two outputs are generated by the toolkit (104) for use in the natural language system. The first such output is a vendor-specific ASR grammar file (112), which is saved in a format that will be recognizable by the automatic speech recognition system, or ASR (118). The ASR system (118) includes two parts, a compiler (114) and the actual speech recognizer (116). In the preferred embodiment, speech recognizer (116) is a continuous speech, speaker independent speech recognizer. Commercially available speech recognizers (116) include the ASR-1500, manufactured by Lernout & Hauspie; Watson 2.0, manufactured by AT&T; and Nuance 5.0, by Nuance. The preferred embodiment of the toolkit (104) is able to generate grammar files for any of these recognizers.

The vendor-specific ASR grammar file (112) contains information regarding the words and phrases that the speech recognizer (116) will be required to recognize, written in a form that is compatible with the recognizer. The file is also optimized to take advantage of peculiarities relating to the chosen speech recognizer (116). For example, experience with the L&H recognizers has shown that L&H grammars perform well if the grammar avoids having multiple rules with the same beginning (three rules starting with "I want"). Optimization of a grammar for an L&H recognizer would rewrite a set of rules from <rule1>:(ab)|(ac)|(ad), to <rule2>:a(b|c|d). Here the three rules of 'rule1' have been rewritten and combined into the one rule of 'rule2'.

In order to operate and recognize speech, the speech recognizer will need to compile the vendor-specific ASR grammar file (112) using a compiler tool (114) supplied by the ASR system (118) vendor. The preferred embodiment of the toolkit (104) knows, when the grammar is first generated, which speech recognizer (116) will be used and is able to format the vendor-specific ASR grammar file (112) accordingly.

The second output from the toolkit (104) is an annotated ASR corpus (122), which is actually a pair of flat files. A sample format for the files is shown in FIG. 3. The first of the pair is a corpus file, and contains a listing of all possible logical sentences or phrases in the grammar (with the exception of variables, discussed below), the compartments (groups of tables) in which they appear, and a value representing the class of the utterance (sentence) heard. The second is an answers file that maps each utterance class with a token, or data value that represents the meaning of implied behind the utterance. These two files will be used by the runtime interpreter (124).

During runtime, a speaker speaks into the microphone (or telephone)(120) attached to the speech recognizer (116). The recognizer (116) identifies the words and phrases it hears and notifies the IVR (130) when a valid utterance has been heard. The IVR (130) is the system which needs the speech understanding capabilities, and includes the necessary external connections and hardware to function (for example, a banking IVR—130 might include a connection to the bank database, a keypad for entering data, a visual display for displaying information, a dispenser for dispensing money, and a speaker for speaking back to the user). This valid utterance is passed, in a computer-readable form such as text, to the IVR (130) which then notifies the runtime interpreter (124) of the utterance that was heard. The runtime interpreter (124) consults the annotated ASR corpus (122) and returns an appropriate token to the IVR (130) for the valid sentence heard by the recognizer (116). This token represents the meaning of the utterance that was heard by the recognizer (116), and the IVR (130) is then able to properly respond to the utterance. The CP (126) and RIAPI (128) serve as software interfaces through which the IVR (130) may access the runtime interpreter (124). It is the IVR (130) that ultimately uses the speech capabilities to interact with the speaker during runtime.

3. The Runtime Interpreter

The runtime interpreter (124) is a software component that receives, in text form, a valid spoken utterance that was heard and context information identifying the compartment(s) to be searched. The runtime interpreter (124) then performs a search through the corpus file (122) (which has been loaded into RAM for faster searching) to find the valid utterance. Once a valid utterance is found in the corpus, the associated token is stored in memory to be retrieved by the IVR (130). In an embedded application, calls made to the runtime interpreter (124) are made by functions within the Custom Processor (126), or CP. The CP (126) is another software component that is originally a transparent "middleman" between the runtime interpreter (124) and the RIAPI (128). The IVR (130), created by the developer, only accesses the functions within the RIAPI (128). The RIAPI (128) will make the necessary CP (126) calls which, in turn, make the necessary runtime interpreter (124) calls.

The purpose for having the CP (126) lies in customizability. The CP (126) can be customized by the developer to enhance the processing of utterances. For example, the developer may wish to perform some type of processing on the utterance before it is actually processed by the runtime interpreter (124). This pre-processing can be added, by the developer, to the CP (126) without actually modifying the runtime interpreter (124). Use of the CP (126) is particularly convenient when the underlying IVR (130) is done in a low level scripting language, such as Vos (by Parity) or BlaBla (by MediaSoft), that does not directly support the pre-processing of the utterance text. If the IVR (130) is written in a higher level language, such as C++, then pre-processing of the utterance text can be done in the IVR (130) code itself, without need for the CP (126).

The runtime interpreter (124) also provides functionality to extract variables from utterances. When the corpus file is first loaded, corpus items that contain variables are flagged. If an initial binary search through the corpus fails to find the exact utterance, a second search is performed to find a partial match of the utterance. This time, only flagged corpus items are searched, and a partial match is found if the utterance contains at least the non-variable portions of a corpus item.

For example, the preferred embodiment corpus file (122) format uses square brackets ('[' and ']') to set off variables from normal words in the valid utterances. Thus, the utterance "I want to transfer [CURRENCY1, money] to savings" might be found in the corpus file. If the spoken utterance heard by the recognizer (116) is "I want to transfer ten dollars to savings", an initial binary search would probably fail to match the spoken utterance with any of the corpus items. If this initial search fails, the interpreter (124) then performs a second search of all flagged corpus items. The spoken utterance that was heard at least contained "I want to transfer . . . to savings", and a partial match would be made. The unmatched words, "ten dollars", would then be processed by another algorithm as a variable of type [CURRENCY1, money] which would convert the phrase "ten dollars" to 10.00 and return 10.00 as the variable associated with the token "money". This variable data is then stored in a predefined data structure that is associated with the location in memory where the token was stored. When the IVR (130) processes the token, it knows that variable data was also returned and retrieves the variable data from memory.

Figure 2:
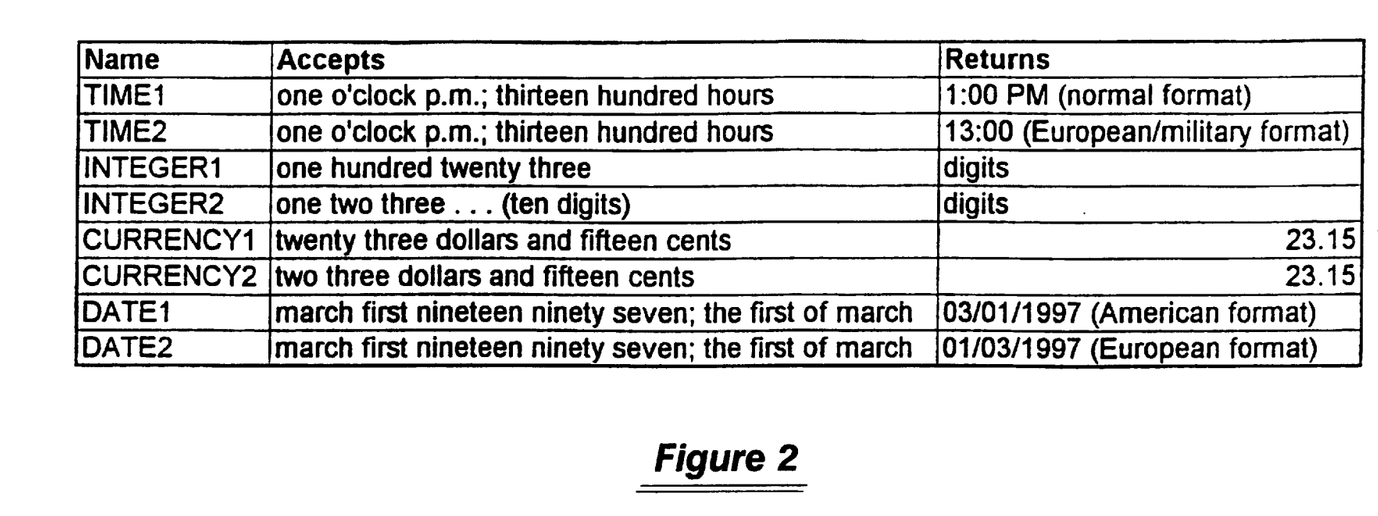
FIG. 2 is a table showing the variable types supported in the preferred embodiment.

The algorithm for converting variables in utterances to variable data depends on the type of data contained within the variable. FIG. 2 shows variable types that are supported by the preferred embodiment. The following pseudocode illustrates the steps used in the preferred embodiment to convert the variable portion of the utterance (in text form) to variable data (in number form).

INTEGER1: ("One hundred thousand and ten")
   Set TEMP result buffer=0;
   Separate variable portion of utterance into individual words (i.e. "one" "hundred" "thousand" "and" "ten") based on blank spaces between words.
   FOR each individual word (reading left to right):
     if (individual word="one"), increase TEMP by 1;
     if (individual word="two"), increase TEMP by 2;
     . . .
     if (individual word="twenty"), increase TEMP by 20;
     if (individual word="thirty"), increase TEMP by 30;
     if (individual word="ninety"), increase TEMP by 90;
     if (individual word="hundred")
       if (TEMP>1000) ("four thousand five hundred", when the word "hundred" is reached, will have been handled as "four thousand five", and TEMP would be 4005. This needs to be changed to 45, before multiplying by 100) TEMP=(TEMP/100)+ least significant digit of TEMP;
       end if;
       multiply TEMP by 100;
     end if;
     if (individual word="thousand"), multiply TEMP by 1000;
     if (individual word="and"), ignore;
   END FOR loop;

INTEGER2: ("One Two Three Four")
   As in INTEGER1, break up variable utterance into Individual words, and set a TEMP buffer=0;
   FOR each individual word (reading left to right) multiply TEMP by 10;
     if (individual word="one"), increase TEMP by 1;
     . . .
     if (individual word="nine"), increase TEMP by 9;
   END FOR;

CURRENCY1: ("Twenty three dollars and fifteen cents")
   As in INTEGER1, break up variable utterance into individual words, and set a TEMP buffer=0;
   FOR each individual word (reading left to right):
     if (individual word="one"), increase TEMP by 1;
     if (individual word="two"), increase TEMP by 2;
     . . .
     if (individual word="twenty"), increase TEMP by 20;
     if (individual word="thirty"), increase TEMP by 30;
     . . .
     if (individual word="ninety"), increase TEMP by 90;
     if (individual word="hundred")
       if (TEMP>1000)
         TEMP=(TEMP/100)+least significant digit of TEMP;
       end if;
       multiply TEMP by 100;
     end if;
     if (individual word="thousand"), multiply TEMP by 1000;
     if (individual word="and"), ignore
     if (individual word="dollars"), multiply TEMP by 100;
     if (individual word="cents"), ignore
   END FOR
   Return the number TEMP/100;

CURRENCY2: ("two three dollars and one five cents")
   As in INTEGER1, break up variable utterance into individual words, and set a TEMP buffer=0;
   FOR each individual word (reading left to right)
     if (individual word="dollars"), multiply TEMP by 100;
     else, multiply TEMP by 10;
     if (individual word="one"), increase TEMP by 1;
     . . .
     if (individual word="nine"), increase TEMP by 9;
     if (individual word="cents"), divide TEMP by 10;
     if (individual word="and"), divide TEMP by 10;
   END FOR;
   Return TEMP/100 as number in dollars;

TIME: ("one o'clock p.m.", "thirteen hundred hours")
   As in INTEGER1, break up variable utterance into individual words, and set buffers HOUR, MIN=0)
   Discard ("o'clock", "minutes", "hours")
     if (first word="one"), HOUR=1;
     . . .
     if (first word="twenty") HOUR=20;
       if (second word="one"), increase HOUR by 1;
       if (second word="two"), increase HOUR by 2;

```
if (second word="three"), increase HOUR by 3;
    next word=third word;
else, next word=second word;
FOR (each individual word from next word on)
    if (individual word="one"), increase MIN by 1;
    ...
    if (individual word="twenty"), increase MIN by 20;
    if (individual word="thirty"), increase MIN by 30;
    if (individual word="forty"), increase MIN by 40;
    if (individual word="fifty"), increase MIN by 50;
    if ((individual word="p.m.") and (HOUR<12))
        increase HOUR by 12;
    end if;
end FOR
if (TIME2), return "HOUR:MIN";
if (TIME1)
    if (HOUR>12)
        decrease HOUR by 12;
        return "HOUR:MIN PM";
    else
        return "HOUR:MIN AM";
    end if;
end if;
DATE1: ("March first nineteen ninety seven", "the first of
March")
As in INTEGER1, break up variable utterance into indi-
    vidual words, and set buffers MONTH, DAY, YEAR,
    UNKNOWN=0 and set flag DONE=N)
FOR each word
    if (word="january"), MONTH=1;
    ...
    if (word="december"), MONTH=12;
    if (word="first", ... "twentieth", or "thirtieth")
        if (word="first"), DAY=1;
        ...
        if (word="twentieth"), DAY=20;
        if (word="thirtieth"), DAY=30;
        if (UNKNOWN is not 0) (i.e., was "twenty" or "thirty")
            Add UNKNOWN to DAY;
            reset UNKNOWN to 0;
        end if;
    else if (word="oh", "one", ... "nineteen")
        if (word="oh") AND (UNKNOWN is not 0)
        Add (UNKNOWN*100) to YEAR;
        UNKNOWN=0;
        go to next word;
        else
        if (YEAR is not 0)
            Add (value of word) to YEAR;
            go to next word;
        else
            if (UNKNOWN is not 0) AND ((value of word)
                <10)
            Add (value of word) and UNKNOWN to YEAR;
            UNKNOWN=0;
            else if (UNKNOWN is not 0)
            Add (100*UNKNOWN) and (value of word) to
                YEAR;
            UNKNOWN=0;
            else
            UNKNOWN=(value of word);
            go to next word;
            end else;
        end else;
        end else;
    else if (word="twenty" or "thirty")
        if (UNKNOWN is not 0)
            Add (100*UNKNOWN) and (value of word) to
                YEAR;
            UNKNOWN=0;
            go to next word;
        else
            UNKNOWN=(value of word);
            go to next word;
        end else;
    else if (word="forty", "fifty", ... "ninety")
        if (UNKNOWN is not 0)
            YEAR=100*UNKNOWN;
            UNKNOWN=0;
        end if;
        if (YEAR is not 0)
            Add (value of word) to YEAR;
            go to next word;
        else
            UNKNOWN=(value of word);
            go to next word;
        end else;
    else if (word="hundred")
        if (UNKNOWN is not 0)
            Add (100*UNKNOWN) to YEAR;
            UNKNOWN=0;
        end if;
        go to next word;
    else if (word="thousand")
        if (UNKNOWN is not 0)
            Add (1000*UNKNOWN) to YEAR;
            UNKNOWN=0;
        end if;
        go to next word;
    end else if;
    if (UNKNOWN is not 0), Add UNKNOWN to YEAR;
    Return MONTH, DAY and YEAR in whatever format
        is selected;
    end FOR;
END DATE;
```

Figure 4:
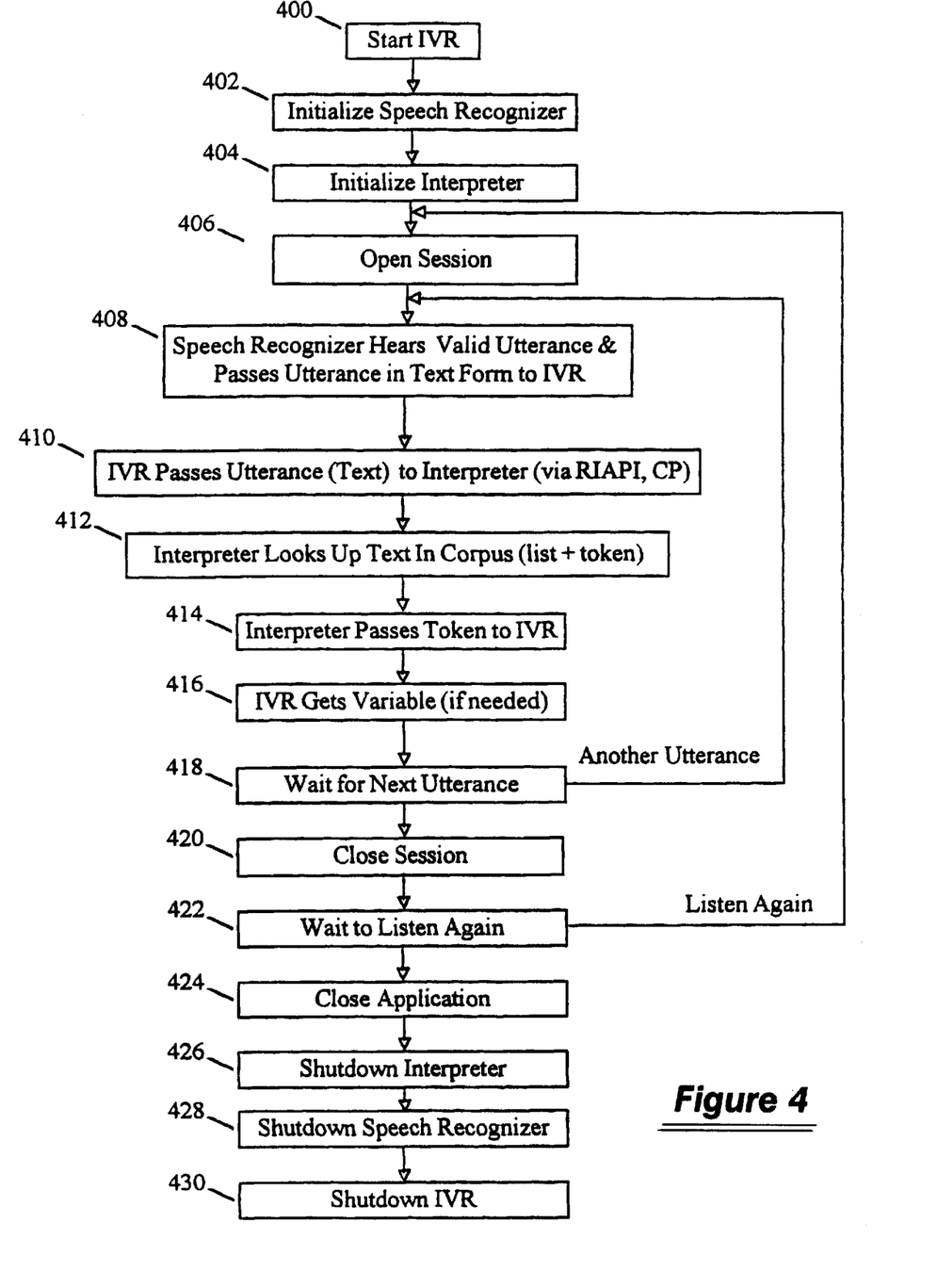
FIG. 4 is a flow diagram depicting the operation of the IVR as it accesses the runtime interpreter.

The basic operation of the runtime interpreter (124), as seen and used by an interactive voice response (IVR) system, is shown in FIG. 4. In the following description, the specific function names used are those found in the preferred embodiment. First, the IVR (130) must be started in step 400. The IVR (130) is a software system for performing other duties, such as controlling a bank's automated teller machine, that takes advantage of the speech understanding capabilities of the present invention. For example, a bank may develop an IVR (130) to provide for a talking automated teller machine. In the preferred embodiment, the IVR (130) is responsible for managing the speech recognizer (116) during runtime.

One of the first things the IVR (130) will want to do is initialize the speech recognizer in step 402. The exact steps necessary for initializing a speech recognizer will vary depending on which commercial speech recognizer is used, but the general steps will involve compiling the vendor-specific ASR grammar (112) that was generated using the toolkit (104), and loading the compiled version into some form of local memory accessible to the speech recognizer (116).

Next, in step 404, the runtime interpreter (124) will need to be initialized. This is done when the IVR (130) calls the NL_Init function. This function essentially receives, as input, a file path and name for the annotated ASR corpus (122) that will be used for the current application and stores this file path and name in memory.

In step 406, the IVR (130) finishes setting up the runtime interpreter (124) by calling the NL_OpenApp function.

This function access the corpus file whose name and file path were stored by the NL_Init function in step 404, and loads the corpus into system memory (RAM) in preparation of being searched. In order to optimize the search, the contents of the corpus file (the various valid utterances) are alphabetized when loaded into RAM. Alphabetizing the valid utterances will enhance the search performance because, in the preferred embodiment, a binary search is used to match an utterance with a token. Binary searches are a common method of searching through sorted lists to find a target element, and basically involves progressively halving the range of list items being searched until the target item is found.

During this loading process, the corpus data is also optimized by 1) flagging corpus items that contain variables and 2) generating the list (from large to small) that specifies the order in which corpus items are processed for the second search. This last bit of optimization is important because, as the second search looks for fragments, smaller fragments (fewer words) may inadvertently match when a larger fragment is more appropriate. For example, the item:

"I want to transfer . . . to savings" is smaller than the item "I want to transfer . . . British pounds to savings". If the spoken utterance is "I want to transfer ten British pounds to savings" and the smaller item is processed first, it will incorrectly match ("I want to transfer . . . to savings" is found) and send the remaining words ("ten British pounds") for processing as a variable in the first item, when "ten" should actually be processed as a variable in the second item. It is important that larger items are processed first when the second search is conducted, and this ordering is done when the corpus is initially loaded into the RAM memory. A separate list of pointers is generated and stored in memory when the corpus is loaded, and this list identifies the order (large to small) in which items with variables should be processed. A list of flagged corpus items is also stored in memory.

Once both the speech recognizer (116) and runtime interpreter (124) have been initialized, and after the runtime interpreter (124) has loaded the corpus, the runtime interpreter is ready to do its job. At this point, the IVR (130) may have other processing to do, and the runtime interpreter (124) waits.

At some point in the future, the IVR (130) will detect that a conversation with a speaker is about to begin. When this happens, the IVR (130) will need to open a session within the runtime interpreter (124) (a session is a dialog exchange with the speaker). The IVR (130) does this by calling the NL_OpenSession function in step 406. This function creates a session handle and associates the session handle with the session that was opened. Future function calls relating to this session will use the session handle to reference the session.

Then, in step 408, the speech recognizer (116) informs the IVR (130) that a complete utterance may have been heard. In the preferred embodiment, speech recognizers (116) are of the type that return data in NBest form. NBest form is simply an output data format that includes a list of possible valid utterances (in text form) heard by the speech recognizer (116) along with a confidence number indicating the likelihood that each valid utterance was heard.

The NBest format is helpful when there are multiple valid utterances that sound alike. For example, if the valid grammar includes "I want honey" and "I want money", and the speaker mumbles "I want mfhoney", the speech recognizer will return both valid utterances as possibilities, rather than simply returning the single valid utterance that it believed sounded most correct. A confidence number is also included for each valid utterance, indicating the speech recognizer's confidence that that particular valid utterance was indeed the one it heard. This plurality of possibilities is helpful when the runtime interpreter (124) also knows the context of the current discussion and can use the context information to more accurately determine which valid utterance was meant. As will be described below, the preferred embodiment of the runtime interpreter (124) will use such context information in its determination of what was meant.

After the IVR (130) receives the output from the speech recognizer (116), the output is then passed, in step 410, to the runtime interpreter (124) for interpretation. To dc so, the IVR (130) will call, in the preferred embodiment, the NL_AnalyzeNBest function. This function accepts as input the NBest data received by the IVR (130), a session handle, and a context pointer indicating the compartment that is to be searched.

When the NL_AnalyzeNBest function is executed, the runtime interpreter (124) then searches through the corpus (122) that has been loaded into memory to find the valid utterance. If a match is found, the return token is stored in memory. If no match is found, the variables search discussed above will be performed and the variable data will be stored in a predefined data structure. This search is shown in step 412.

After calling NL_AnalyzeNBest, the IVR (130) will need to call NL_GetResult, in step 416, to retrieve from memory the token stored by the NL_AnalyzeNBest function. If the token indicates that a variable was included in the utterance, then the IVR (130), in step 416, will call NL_GetVariable to retrieve the variable values from the predefined data structure in memory used by NL_AnalyzeNBest to store the variable data.

Once the token and any necessary data have been stored in memory, the runtime interpreter (124) is finished for the session (for now). In step 418, the runtime interpreter (124) waits for either another utterance or an end to the session.

If another utterance occurs, the speech recognizer (116) will again notify the IVR (130) in step 408, the IVR (130) will call NL_AnalyzeNBest in step 410, and the process continues as it did before.

If the session is to end, the IVR (130) will call NL_CloseSession in step 420. Closing the session deassociates the session handle.

At this point, step 422, the runtime interpreter (124) waits for either a new session to begin or for the command to shut down the current application. If a new session is to begin, the IVR (130) will call NL_OpenSession again in step 404 and processing continues from step 404 as before. If the current application is to be shut down, then IVR (130) will call NL_CloseApp in step 424 to release the memory that had been allocated when the application was opened.

Then, in step 426, the IVR (130) calls NL_Shutdown to undo the effects of NL_Init.

Finally, in steps 428 and 430, the IVR (130) is responsible for shutting down the speech recognizer (116) as well as the IVR (130) itself. The actual steps necessary will vary depending on the selected speech recognizer (116) as well as the IVR developer.

The runtime interpreter (124) also provides functionality for the developer who wishes to manage the Nbest data passed by the CP (126). Functions are available to create Nbest buffers (NB_CreateBuffer); create an Nbest buffer with only one utterance (NB_CreateOneBest); set an utterance in an Nbest buffer (NB_SetUtterance); set a score for an utterance in an Nbest buffer (NB_SetScore); set an utterance/score pair in an Nbest buffer (NB_SetUtteranceScore); determine the number of utterances that can be stored in the Nbest buffer (NB_GetNumResponses); get an utterance from an Nbest buffer (NB_GetUtterance); get a score from an Nbest buffer (NB_GetScore) and release the memory allocated for a specified Nbest buffer (NB_DestroyBuffer).

4. The Runtime Interpreter Application Program Interface

The runtime interpreter application program interface (128), or RIAPI, is the set of software functions actually used by the developer of the IVR (130) to interact with the runtime interpreter (124). The functions which are included in the preferred embodiment of the RIAPI (128) include: NL_Init( ), NL_OpenApp( ), NL_OpenSession( ), NL_AnalyzeNbest( ), NL_GetResult( ), NL_GetVariable( ), NL_CloseSession( ), NL_CloseApp( ) and NL_Shutdown( ).

NL_Init is an initialization function that is called one time during startup to process initialization information and allocate memory for sessions. Initialization information can include a name for a local log file, the maximum number of sessions and the routing mode (embedded or distributed—distributed architecture will be discussed further below). A call to NL_Init, in the exemplary embodiment, results in a call to CP_Init (the CP equivalent), which then calls SAI_Init (the runtime interpreter 124 equivalent). Most of the following RIAPI (128) functions will also result in function calls to the CP (126), which then calls the corresponding runtime interpreter (124) function. Two exceptions in the preferred embodiment are the NL_GetVariable and NL_GetResult function, which directly access memory to retrieve the variable or result.

NL_OpenApp is called to establish an application in the interpreter (124). As stated before, an application is an instance, or implementation, of a project. Opening an application causes the interpreter (124) to load the corpus files (122) associated with the application.

NL_OpenSession is called when a session is desired under an open application. A session is essentially a conversation with a speaker, and it is possible for several sessions to exist for the same application (if the IVR 130 manages several speech recognizers, for example).

NL_AnalyzeNbest is called by the IVR (130) when the speech recognizer has indicated that it has Nbest output ready. The IVR (130) calls this function to send this Nbest output, as well as contextual information, to the runtime interpreter (124) for analysis.

NL_GetResult is called by the IVR (130) to read the token which was stored in memory by the runtime interpreter (124).

NL_GetVariable is called when the token stored by the interpreter (124) is of a type that has variable data associated with it. The call to NL_GetVariable retrieves this variable data from a memory data structure used by the interpreter (124) to store the data.

NL_CloseSession is called to close the specified session and return any allocated resources that were associated with the session. Calling this function may result in the calling of other functions that are also necessary for closing the session. For example, in the embedded architecture, NL_CloseSession calls CP_CloseSession to allow the CP (126) and runtime interpreter (124) an opportunity to properly close their respective sessions and return allocated resources that they no longer need.

NL_CloseApp is called to close the specified application. This function checks to ensure that all sessions have been closed, and may also call other functions such as CP_CloseApp to allow the CP (126) and interpreter (124) the opportunity to "clean up after themselves" as well.

NL_Shutdown is called to essentially return the system to the state that existed before NL_Init was called. CP_Shutdown may also be called to have the CP (126) and interpreter (124) deallocate their resources.

In addition to these basic functions, the RIAPI (128) is also provided with inter/intranet capabilities. If the natural language system is connected via TCP/IP to a network, the TcpCallback function can be used to process asynchronous TCP/IP socket events. The following RIAPI calls designed to support connections through Server Interface Process (SIP) to the internet are also available (although not necessary for non-SIP systems): NL_WEBConnect (to open a session with a remote web browser user), NL_ReportWEBText (to pass text responses to the interpreter 124), NL_WEBPlay (to present or display file contents to the remote user), NL_WEBListen (to direct one seesion to accept input from the SIP instance connected by NL_WEBConnect), NL_GetWEBResult (to retrieve results of an NL_WEBListen call) and NL_CloseWEBSession (to close a session).

As an interface between the IVR (130) and (ultimately) the runtime interpreter (124), the specific calls made to the RIAPI (128) will be dictated by the needs of the IVF (130) for the functionality of the runtime interpreter (124).

5. Overview of the Distributed Architecture

Thus far, this specification has been describing the elements of an embedded system architecture. In an embedded architecture, both the runtime interpreter (124) and RIAPI (128) are software elements that reside on the same computer.

Figure 5:
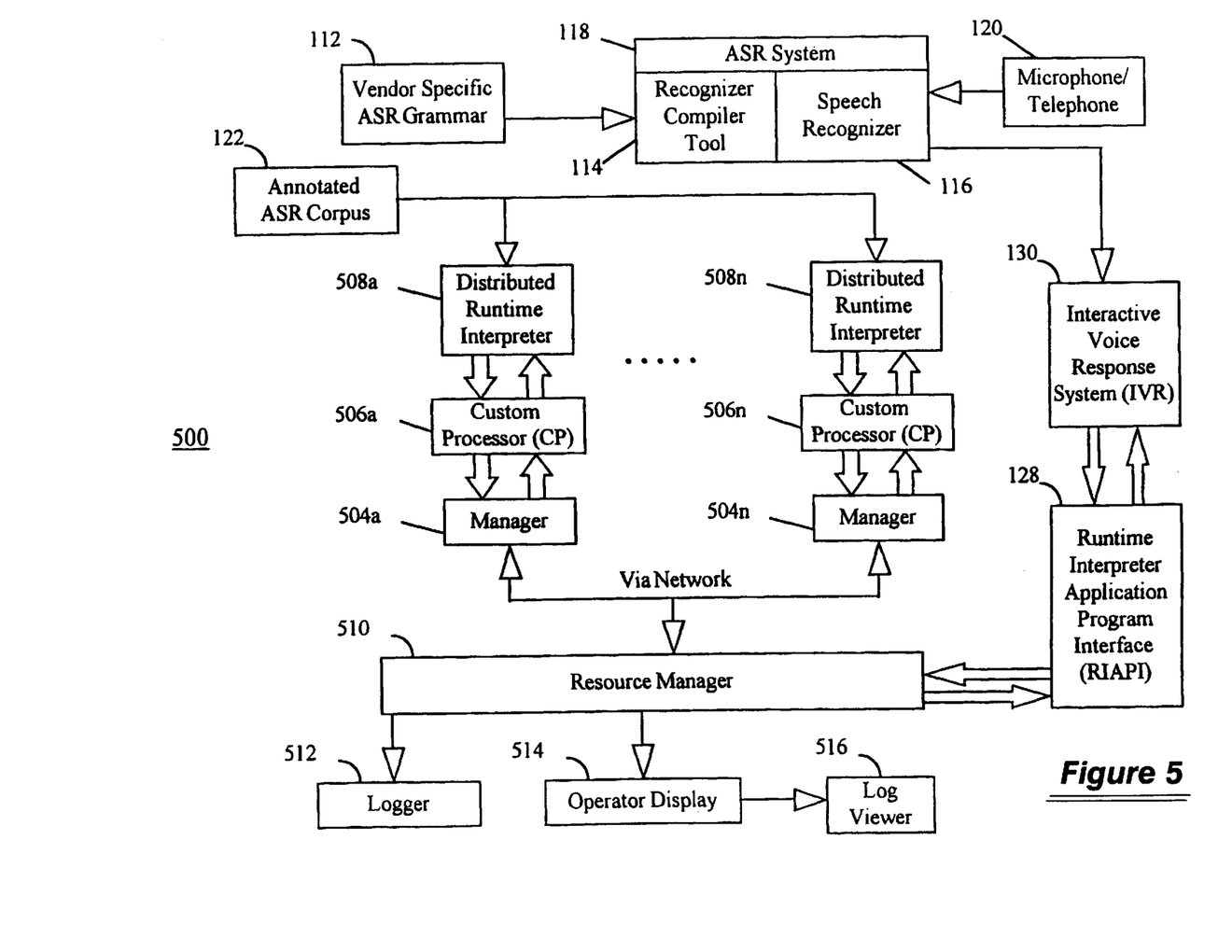
FIG. 5 depicts the distributed system architecture.

In a distributed architecture, a plurality of distributed runtime interpreters (508) is located among a plurality of locations within a computer network (in the preferred embodiment, both Unix and Windows NT networks are supported). By having this plurality of interpreters (508), the IVR (130) is able to have a number of utterances processed simultaneously. The clearest advantage to this is the ability to operate multiple sessions at the same time.

FIG. 5 shows the elements of a distributed system architecture. Most of the elements are the same as the ones found in the embedded architecture. Both the grammar (112) and corpus (122) are the same as those used in the embedded architecture. The differences are the plurality of distributed interpreters (508), the resource manager (510—RM), logger (512), operator display (514) and log viewer (516). The distributed interpreters (508) and RM (506) are discussed further below.

The logger (512) is simply a software device that records the various messages that are sent between the resource manager (510) and various interpreters (508). Operator display (514) and log viewer (516) are means by which the developer may monitor the operation of the IVR (130) and the various interpreters connected to the system. In the preferred embodiment, the logger (512), operator display (514) and log viewer (516) do not allow the user or operator any control over the IVR (130) application. These devices merely provide information on the operation of the application.

6. The Distributed Interpreter

In an alternative embodiment of the present invention, a distributed system is used. The distributed system operates on a networked computer system. A networked computer system simply means a plurality of computers, or nodes, which are interconnected to one another via a communications network.

In a distributed system, each node that performs interpreting duties has a DI manager (504), a DICP (506) and a DI runtime interpreter (508). The DICP (506) and DI runtime interpreter (508) have the same functionality as the CP (126) and runtime interpreter (124) found in the embedded architecture discussed above. The DI manager (504) is another piece of software that is responsible for message processing and coordination of the interpreting duties of the node. Message processing depends on the type of network used to connect the node to the resource manager (510). However, the same general message types are used. The message types and purposes are discussed below.

The manager (504) itself is a software component, and before it can process any messages it must first be executing on the interpreting node. When the manager (504) is started, it will look in an initialization file for information regarding the application supported by the manager (504). This information includes the name of the application supported, and the file path to the location of the annotated corpus (122) to be used for the application supported.

The <initialize> message causes the DI manager (504) to initialize the DICP (506) by calling CP_Init, and the DICP (506) initializes the DI runtime interpreter (508) by calling SAI_Init. This message also causes the DI manager (504) to initialize the application to be supported, by calling CP_OpenApp and SAI_OpenApp to open the application. As discussed above, opening an application requires loading the corpus (122). The location of the corpus (122) to be loaded is passed on to the DI runtime interpreter (508). When the DI runtime interpreter (508) completes its initialization (and the corpus 122 is loaded), it generates an application handle which is a data object that references the current application. This handle is returned to the DICP (506), which in turn passes it back to the DI manager (504). Whenever an error occurs within the DI, the DI manager (504) composes a <tell error> message describing the error and returns it to the RM (510).

A session will be opened when the DI manager (504) receives a <start session> message. This message includes a resource address which identifies the sending IVR (130) and a session identifier. The DI manager (504) checks to make sure there is not already a session opened with the same resource address, and if there is not, creates a session object which will represent the session. A session object is essentially a handle, similar to the application handle discussed above, that references this session. The DI manager (504) then opens the session in the DICP (506) and DI runtime interpreter (508) by calling the CP_OpenSession function, which calls the SAI_OpenSession function. The return value of SAI_OpenSession is passed back to CP_OpenSession, which returns it to the DI manager (504). Again, errors are reported by the DI manager (504) with a <tell error> message.

Once a session has been opened, the DI is ready to interpret. There are two messages which can start the process of interpretation. First, the DI manager (504) could receive an <analyze> message. An <analyze> message contains all the context and nbest information normally needed for CP_AnalyzeNbest. The DI manager (504) then calls the DI runtime interpreter (508) convenience functions NB_CreateBuffer and NB_SetUtteranceScore to prepare a structure with the context and nbest data. The DI manager (504) then provides this data structure as input to the CP_AnalyzeNbest function, which calls the SAI_AnalyzeNbest function which performs the search described above for the embedded architecture. When these functions have completed, their return values propagate back to the DI manager (504), which composes and sends a <reply> message back to the RM (510).

Receiving the <analyze> message was just one way the interpretation could be started. The other way occurs when the context and nbest data are sent in separate messages. When this occurs, the RM (510) sends a first message, or <state> message, containing the context and a resource address identifying the session in which the utterance was heard. Upon receipt of this message, the DI manager (504) first confirms that the resource address is indeed that of an existing session. If it is, the DI manager (504) retrieves the session handle associated with the resource address, and stores the context information from the message in a temporary memory area to await further processing.

This further processing will occur when the second message is received by the DI manager (504). The second message, or <nbest> message, contains a resource address and some nbest data. When the <nbest> message is received, the DI manager (504) again checks to make sure the resource address included in the <nbest> message is that of an existing session. If so, the DI manager (504) then looks to the temporary memory area associated with the session, and finds the previously stored context information. Taking the nbest data and context data, the DI manager (504) then makes a call to CP_AnalyzeNbest, which then calls SAI_AnalyzeNbest, where the corpus (122) is searched to find the token associated with the utterance in the nbest data.

A session is ended when the DI manager (504) receives the <lost call> message. This message includes a resource address, and the DI manager (504) checks to make sure that the resource address does indeed reference an open session. If so, the DI manager (504) calls CP_CloseSession, which then calls SAI_CloseSession, and the session is closed much in the same way a session is closed in the embedded architecture.

If the entire application, is to be shut down, the DI manager (504) will receive a <terminate> message. Since each manager (504) can only support one application at a time, shutting down an application is the same as shutting down the manager (504). When the DI manager (504) receives this message, it makes the necessary calls to CP_CloseSession to close any remaining sessions that are open, and finally calls CP_Shutdown, which calls SAI_ShutDown, and all resources allocated to the manager (504), DICP (506) and DI runtime interpreter (508) are released.

7. The Resource Manager

The resource manager (510) monitors the operation of the various distributed interpreters (508) connected to the network, and distributes RIAPI (128) requests among the interpreters (508). In the preferred embodiment, the RM (510) receives a message whenever a distributed interpreter (508) is initiated and records the application that is supported by the distributed interpreter (508). Then, as the resource manager receives requests from the IVR(s) (130) through the RIAPI (128), it checks to see which distributed interpreter (508) can handle the request (supports the application) and formulates a message containing the IVR (130) request and sends it to the appropriate manager (504) for processing. The resource manager (510) communicates with managers (504) using the messages described above.

In light of the above teachings, it is understood that variations are possible without departing from the scope of the invention embodied in these teachings. Any examples provided as part of the inventors' preferred embodiment are presented by way of example only, and are not intended to limit the scope of the invention. Rather, the scope of the invention should be determined using the claims below.

What is claimed is:

1. A computer system for identifying the implied meaning behind a plurality of predetermined different valid spoken utterances in a grammar, said system comprising:
   a. a central processing unit (CPU);
   b. a system memory coupled to said CPU for receiving and storing memory files and applications files;
   c. an automatic speech recognition (ASR) system coupled to said CPU comprising a speech recognizer coupled to receive spoken utterances and for producing valid utterances as an output as digital characters in word format;
   d. a vendor specific automatic speech recognition (ASR) grammar stored in said system memory for cortrolling the output of said ASR system to provide said predetermined valid spoken utterances;
   e. an interactive voice response (IVR) system coupled to said speech recognizer for receiving and processing said digital characters and words from said ASR;
   f. runtime interpreter means stored in said system memory and coupled to said IVR system and said CPU for receiving from said IVR system said digital characters and words representative of said valid spoken utterances;
   g. an annotated automatic speech recognition (ASR) corpus file, stored in said memory which contains a listing of all valid spoken utterances in said grammar and associated token data stored in said memory representing the implied meaning behind each said listed valid utterance; and
   h. said runtime interpreter means comprising a runtime interpreter coupled between said ASR corpus file and said IVR system for receiving valid spoken utterances and searching said ASR corpus file for a match and for returning said token data representing said valid spoken utterance to said IVR system for a prompt or a response.

2. The system of claim 1, where said runtime interpreter means further includes means for performing a comparison search through said annotated ASR corpus in said to find said token data identifying said meaning of the implied system memory detected valid utterance.

3. The system of claim 2, where said runtime interpreter means further includes a routine interpretor for performing a partial match search through contents of said annotated ASR corpus upon failure of said comparison search, where said partial match search seeks a partial match of said detected valid utterance in said annotated ASR corpus.

4. The system of claim 3, where said runtime interpreter means further includes variable processing means for processing the unmatched portion of said detected valid utterance as a variable to identify the implied meaning of said unmatched portion.

5. The system of claim 4, where said variable processing means generates variable data representing the meaning of said unmatched portion of said detected valid utterance.

6. The system of claim 1, wherein said runtime interpreter means further comprising a runtime interpreter application program interface (RIAPI), coupled to said runtime interpreter, where said RIAPI is an interface used by said IVR system to access said runtime interpreter.

7. The system of claim 6, further comprising a custom processor (CP) interface, coupled to said RIAPI and said runtime interpreter, comprising an interface used by said RIAPI to access said runtime interpreter.

8. The computer system of claim 1, wherein said computer system is a network system having a plurality of said runtime interpreters distributed on a plurality of computers on said computer system network.

9. The computer system of claim 8, further comprising a resource manager for managing access to said plurality of runtime interpreters.

10. A speech enabled computer system, comprising:
    a. a CPU;
    b. a system memory coupled to said CPU;
    c. a vendor-specific automatic speech recognition (ASR) grammar file stored in said system memory;
    d. an automatic speech recognition system, coupled to said ASR grammar file in said CPU, for detecting predetermined valid spoken utterances and for generating as an output characters and words in digital format,
    e. an annotated ASR corpus file, stored in said system memory, containing a listing of all predetermined valid utterances and token data representing the implied meaning of each listed valid utterance;
    f. runtime interpreter means coupled to said annotated ASR corpus file and said CPU for searching through the contents of said annotated ASR corpus file to find token data representing the implied meaning of said detected valid spoken utterance;
    g. said runtime interpreter means comprising a custom processor interface (CP), coupled to said CPU, for accessing aid corpus file;
    h. a runtime interpreter application program interface (RIAPI), coupled to said CP; and
    i. an interactive voice response system (IVR), coupled to said RIAPI and said ASR system, wherein said IVR issues requests to said RIAPI to search the contents of said annotated ASR corpus file and return token data representing the implied meaning of said valid spoken utterance detected by said ASR system.

11. A method for identifying the implied meaning behind a valid spoken utterance in a grammar, comprising the steps of:
    a. loading an annotated ASR corpus file into a computer system memory, where said annotated ASR corpus file contains a listing of all various possible valid utterances in said grammar, as well as an associated token data for each of said listed valid utterances representing the implied meaning behind said valid utterances;
    b. converting valid spoken utterances to digital requests;
    c. receiving a request at an IVR to search said annotated ASR corpus file for the occurrence of a detected valid utterance;
    d. performing a first search through said loaded annotated ASR corpus file in said system memory to find a said valid utterance using a runtime interpreter; and
    e. returning token data corresponding to said detected valid utterance in said loaded annotated ASR corpus file to said sender of said request.

12. The method of claim 11, further comprising the steps of:
    performing a second search through said loaded annotated ASR corpus upon failure of said first search, where said second search seeks a partial match of said detected valid utterance in said annotated ASR corpus; and
    processing the unmatched portion of said detected valid utterance as a variable and returning variable data to the sender of said request, where said variable data represents the meaning of said unmatched portion.

13. The method of claim 11, further comprising the step of using a runtime interpreter application program interface (RIAPI) to access said ASR corpus file using said runtime interpreter.

14. The method of claim 13, further comprising the step of using a custom processor (CP) interface to access said runtime interpreter.

15. A computer system for identifying an implied meaning behind a plurality of different valid spoken utterances in a grammar and generating prompts and replies, said system comprising:

a) a central processing unit (CPU);
   b) a system memory coupled to said CPU for receiving memory files and application files;
   c) an automatic speech recognition (ASR) system coupled to receive said spoken utterances and for producing digital characters and words as an output;
   d) a recognizer complier in said (ASR) system for establishing said plurality of valid spoken utterances as said ASR system output;
   e) a vendor specific grammar in said CPU coupled to said ASR system;
   f) an interactive voice response (IVR) system coupled to said automatic speech recognizer for receiving and processing said digital characters and words;
   g) runtime interpreter means stored in said system memory of said CPU and coupled to said IVR system for receiving from said IVR system said digital characters and words representative of said valid spoken utterances;
   h) an annotated automatic speech recognition (ASR) corpus file coupled to said runtime interpreter means and comprising a listing of all valid spoken utterances in a grammar format and associated token data representing the meaning behind each of said listed utterances; and
   i) said runtime interpreter means being coupled between said ASR corpus file and said IVR systems for searching said ASR corpus file for a match and returning said associated token data to said IVR system to enable a prompt or a reply to said spoken utterances.

16. The system of claim 15 wherein said runtime interpreter means further includes an application program interface for coupling a known IVR system to said runtime interpreter.

17. The system of claim 16 wherein said ASR system comprises a known speech recognizer adapted for use in the present invention system by said recognizer complier for a vendor specific grammar.

18. The system as set forth in claim 15 wherein said annotated ASR corpus file further includes values of variables returned when a search in said ASR corpus file results in a partial match.

19. A natural language (NL) system for understanding the meaning behind sequences of predetermined different spoken words, said system having a central processor with a system memory for receiving and storing memory files and application files, said application files including an automatic speech recognition ASR system having a speech recognition (SR) grammar for recognizing valid spoken utterances, said NL system being characterized by;

an interactive voice response (IVR) system coupled to said ASR system for receiving predetermined valid spoken utterances recognized by said ASR system,
   an ASR corpus file containing all combinations of valid spoken utterance recognizable by said ASR system and token data which represents the meaning behind each sequence of valid spoken utterances,
   a runtime interpreter coupled between said IVR system and said ASR corpus file for searching said corpus file to find a matching valid utterance for each said spoken valid utterance, and for
   obtaining said token data associated with said matching valid utterance, and for
   returning said token data to said IVR to enable said IVR to generate a voice responsive prompt or a reply to said valid spoken utterance.

* * * * *